US008615226B2

(12) United States Patent
Matsui et al.

(10) Patent No.: US 8,615,226 B2
(45) Date of Patent: Dec. 24, 2013

(54) DATA COMMUNICATION SYSTEM, RELAY APPARATUS, AND PORTABLE TERMINAL APPARATUS

(75) Inventors: Kazuki Matsui, Kawasaki (JP); Hideto Kihara, Kawasaki (JP); Soichi Nishiyama, Kawasaki (JP); Yasuhiko Awamoto, Tokyo (JP); Hiroshi Kokubo, Tokyo (JP); Chizu Tuge, Tokyo (JP); Yoshiyuki Ito, Kawasaki (JP); Norie Tachibana, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1747 days.

(21) Appl. No.: 11/603,145

(22) Filed: Nov. 22, 2006

(65) Prior Publication Data

US 2007/0147323 A1 Jun. 28, 2007

(30) Foreign Application Priority Data

Dec. 27, 2005 (JP) ................................. 2005-376108

(51) Int. Cl.
*H04M 3/00* (2006.01)
(52) U.S. Cl.
USPC ......... 455/419; 455/566; 455/456.1; 712/244
(58) Field of Classification Search
USPC ...................................................... 455/566
See application file for complete search history.

(56) References Cited

U.S. PATENT DOCUMENTS

| 5,815,508 | A | * | 9/1998 | Wadzinske et al. ........... 714/704 |
| 5,991,758 | A | * | 11/1999 | Ellard .................................... 1/1 |
| 6,785,023 | B1 | | 8/2004 | Iida |
| 6,918,053 | B1 | * | 7/2005 | Thatte et al. ..................... 714/16 |
| 7,242,856 | B2 | * | 7/2007 | Ishida et al. .................. 386/124 |
| 2002/0054119 | A1 | * | 5/2002 | Dow et al. ....................... 345/772 |
| 2003/0017857 | A1 | * | 1/2003 | Kitson et al. .................. 455/566 |
| 2003/0208595 | A1 | * | 11/2003 | Gouge et al. .................. 709/225 |
| 2003/0225905 | A1 | * | 12/2003 | Scifres et al. ................. 709/234 |
| 2004/0090643 | A1 | | 5/2004 | Ochi |

(Continued)

FOREIGN PATENT DOCUMENTS

| JP | 3-282856 A | 12/1991 |
| JP | 4-13332 A | 1/1992 |

(Continued)

OTHER PUBLICATIONS

Mobile Agent, 2006 Fujitsu.

(Continued)

*Primary Examiner* — German J Viana Di Prisco
(74) *Attorney, Agent, or Firm* — Westerman, Hattori, Daniels & Adrian, LLP

(57) ABSTRACT

There are provided: a data communication system, a relay apparatus, and a portable terminal apparatus in which when a mobile portable terminal apparatus such as a mobile telephone displays a screen based on display screen definition data received from a central apparatus, the exception handling of the data communication can be dynamically changed according to the communication environment of the portable terminal apparatus. The central apparatus adds, to the display screen definition data, communication control data where an exception handling procedure for communication between the portable terminal apparatus and the central apparatus is set. The portable terminal apparatus displays an image based on the display screen definition data received from the central apparatus, and performs data communication with the central apparatus according to the communication control data extracted from the display screen definition data.

6 Claims, 11 Drawing Sheets

(56) References Cited

U.S. PATENT DOCUMENTS

| | | | |
|---|---|---|---|
| 2004/0117803 A1* | 6/2004 | Srivastava et al. | 719/318 |
| 2004/0181572 A1* | 9/2004 | Lee et al. | 709/200 |
| 2004/0209610 A1* | 10/2004 | Adwankar et al. | 455/419 |
| 2004/0210800 A1* | 10/2004 | Ghislain Gabriel Vecoven et al. | 714/47 |
| 2005/0005000 A1 | 1/2005 | Yoshimoto | |
| 2005/0015772 A1* | 1/2005 | Saare et al. | 719/310 |
| 2005/0080496 A1* | 4/2005 | Hayes et al. | 700/65 |
| 2005/0188004 A1* | 8/2005 | Bergenwall et al. | 709/203 |
| 2005/0193286 A1* | 9/2005 | Thatte et al. | 714/48 |
| 2005/0251558 A1* | 11/2005 | Zaki | 709/206 |
| 2006/0082467 A1* | 4/2006 | Funk et al. | 340/815.45 |
| 2007/0050137 A1* | 3/2007 | Woon et al. | 701/219 |
| 2011/0035431 A1* | 2/2011 | Geary et al. | 709/203 |

FOREIGN PATENT DOCUMENTS

| | | |
|---|---|---|
| JP | 2000-222333 A | 8/2000 |
| JP | 2004-40556 A | 2/2004 |
| JP | 2004-151953 A | 5/2004 |
| JP | 2004-265397 A | 9/2004 |
| WO | WO 2005/114447 | 12/2005 |

OTHER PUBLICATIONS

Search Report dated Feb. 14, 2007, Application No. GB0622816.7.
Akutsu, Yoshikazxu et al.; "Simple Adaptation and Comfortable Operation, as an Answer Book for a Home Server Configuration, Configuration of One's Own Home—Monitoring System (First Half) "DOS/V Special"," The 15TH time, vol. 103, pp. 73-75, Sep. 1, 2004. (w/partial English translation).
Japanese Office Action dated Feb. 8, 2011, issued in corresponding Japanese Patent Application No. 2005-376108.

* cited by examiner

FIG. 3

```
<html>
...OTHER DATA DEFINITION
<form id="_id0" method="post"
 action="/post.jsp"
 enctype="application/x-www-form-urlencoded" >

<input type="text" name="INPUT DATA" value="" />
<input type="submit" name="SUBMIT DATA" value="" />

Validation Error:Value is required.
<input type="hidden" name="_id0" value="id0" />

</form>
</html>
```

FIG. 4

```
<html>
...OTHER DATA DEFINITION
<form id="_id0" method="post"
   action="/post.jsp"
41{ retry=10
    interval=60sec
   enctype="application/x-www-form-urlencoded" >

<input type="text" name="INPUT DATA" value="" />
<input type="submit" name="SUBMIT DATA" value="" />

Validation Error:Value is required.
<input type="hidden" name="_id0" value="id0" />

</form>
</html>
```

F I G. 6

| MODEL ID | ... | retry | interval | ... |
|---|---|---|---|---|
| xxx | ... | xxx | xxx | ... |
| xxx | ... | xxx | xxx | ... |
| ⋮ | ⋮ | ⋮ | ⋮ | ⋮ |

FIG. 10

```
<html>
…OTHER DATA DEFINITION
<form id="_id0" method="post"
    action="/post.jsp"
51─ async=true
41 ⎰ retry=10
    ⎱ interval=60sec
52 ⎰ onSendUrl=/waiting.html
    ⎱ onResponseUrl=/complete.html
    enctype="application/x-www-form-urlencoded" >

<input type="text" name="INPUT DATA" value="" />
<input type="submit" name="SUBMIT DATA" value="" />

Validation Error:Value is required.
<input type="hidden" name="_id0" value="id0" />

</form>
</html>
```

DATA COMMUNICATION SYSTEM, RELAY APPARATUS, AND PORTABLE TERMINAL APPARATUS

CROSS-REFERENCE OF RELATED APPLICATION

This nonprovisional application claims priority under 35 U.S.C.§119(a) on Patent Application No. 2005-376108 in Japan on Dec. 27, 2005, the entire contents of which are hereby incorporated by reference.

BACKGROUND OF THE INVENTION

The present invention relates to a data communication system, a relay apparatus, and a portable terminal apparatus in which when a mobile portable terminal apparatus such as a mobile telephone displays a screen based on display screen definition data received from a central apparatus, the exception handling of the data communication can be changed according to the communication environment of the portable terminal apparatus.

With the recent advancement of the computer technology, the communication environment infrastructure has been improving that enables stable mobile communications using mobile units such as mobile telephones and portable terminal apparatuses. Under such an environment, data communication systems where applications the information of which has been conventionally shared in the office can be used outside the office and data communication systems in which such applications can also be used when the mobile unit is moving have been developed in a large number.

For example, when an SFA (Sales Force Automation) application is used with a portable terminal apparatus, the salesperson carrying the portable terminal apparatus establishes communication between the portable terminal apparatus and the SFA server by using a communication protocol such as the HTTP (Hypertext Transfer Protocol), and receives, for example, the display screen definition data from the SFA server, thereby displaying the screen of the desired application on the display of the portable terminal apparatus. The salesperson as the user inputs daily reports, progress reports and the like through the screen displayed on the portable terminal apparatus, transmits them to the SFA server, and stores them into a database or the like of the SFA server.

Under such a mobile communication environment, the established communication can be ceased due to fluctuations in communication traffic or the like. When communication is interrupted in midstream, exception handling is performed such that retry processing is performed a predetermined number of times or that retry processing is performed at predetermined time intervals. Since such exception handling is defined by a service providing program stored in the central apparatus and it is difficult to update the program itself, normally, an exception handling parameter is selected based on the information provided by the user, and the exception handling is performed based on the selected parameter (see Japanese Patent Application Laid-Open No. H04-013332).

BRIEF SUMMARY OF THE INVENTION

However, in the above-described conventional data communication system, it is necessary for the user to specify which exception handling is to be performed. That is, when communication is interrupted in midstream, the user specifies, before performing data communication, how many times retry processing is performed and at which time interval retry processing is performed, and transmits the specification to the central apparatus. The central apparatus sets the communication parameter according to the user's specification, and executes the specified exception handling. Therefore, it is impossible to respond in real time to dynamic environmental fluctuations due to movements. For example, although the exception handling for a communication interruption due to the entrance into a tunnel and the exception handling for frequent communication interruptions due to a movement to an inland where base stations are sporadic are different from each other, in the conventional data communication system, it cannot be helped to uniquely predetermine the exception handling in the program during the development of the system.

In addition, the possibility is left that the specified exception handling is not always the most suitable exception handling because of poor compatibility between the portable terminal apparatus and the central apparatus. That is, there can be cases where the exception handling specified because it is considered to be the most suitable exception handling cannot maintain a stable communication environment because of poor compatibility between the apparatuses.

The present invention is made in view of such circumstances, and an object thereof is to provide a data communication system, a relay apparatus, and a portable terminal apparatus in which when a mobile portable terminal apparatus such as a mobile telephone displays a screen based on display screen definition data received from the central apparatus, the exception handling of the data communication can be dynamically changed according to the communication environment of the portable terminal apparatus.

To attain the above-mentioned object, a data communication system according to a first aspect comprises: a portable terminal apparatus having a display for displaying an image; and a central apparatus capable of data communication with said portable terminal apparatus, said portable terminal apparatus displaying the image on the display based on display screen definition data received from said central apparatus, and transmitting data accepted through the displayed image to said central apparatus, wherein said central apparatus comprises: means for storing the display screen definition data defining the image displayed on the portable terminal apparatus; and means for adding communication control data where an exception handling procedure for the communication between said portable terminal apparatus and said central apparatus is set, to the display screen definition data, said portable terminal apparatus comprises: means for extracting the communication control data from the received display screen definition data, and said portable terminal apparatus performs data communication with said central apparatus according to the extracted communication control data.

Moreover, in a data communication system according to a second aspect, said central apparatus further comprises: a database storing the communication control data so as to be associated with environment data identifying a communication environment of said portable terminal apparatus; and means for extracting the communication control data from said database based on the environment data received from said portable terminal apparatus; and means for adding the extracted communication control data to the display screen definition data.

Moreover, in a data communication system according to a third aspect, the communication control data includes information to specify an image displayed on said portable terminal apparatus from start to end of the communication between said portable terminal apparatus and said central apparatus.

Moreover, a relay apparatus according a fourth aspect is a relay apparatus that relays data communication between a portable terminal apparatus having a display for displaying an image and a central apparatus, and comprises: means for adding communication control data where an exception handling procedure for the communication between said portable terminal apparatus and said central apparatus is set, to display screen definition data received from said central apparatus, said display screen definition data defining the image displayed on the display of said portable terminal apparatus, wherein the display screen definition data to which the communication control data is added is transmitted to said portable terminal apparatus.

Moreover, a portable terminal apparatus according to a fifth aspect is a portable terminal apparatus that is capable of data communication with an outside, has a display for displaying an image, displays the image on the display based on display screen definition data received from the outside, and transmits the data accepted through the displayed image, to the outside, and comprises: means for extracting communication control data where an exception handling procedure for the data communication is set, from the display screen definition data defining the image displayed on the display; and means for performing the data communication with the outside according to the extracted communication control data.

According to the first aspect, the portable terminal apparatus displays the image based on the display screen definition data received from the central apparatus, and transmits the data accepted through the displayed image, to the central apparatus. The central apparatus stores the display screen definition data defining the image displayed on the portable terminal apparatus, adds to the display screen definition data the communication control data where the exception handling procedure for the communication between the portable terminal apparatus and the central apparatus is set, and transmits the display screen definition data to which the communication control data is added, to the portable terminal apparatus. The portable terminal apparatus receives the display screen definition data, and extracts the communication control data. The portable terminal apparatus performs data communication with the central apparatus according to the extracted communication control data. Thereby, the portable terminal apparatus can determine the number of retries at the time of the occurrence of a communication anomaly and the time interval between the retries according to the communication control data added to the display screen definition data received for displaying images, and for example, even when the communication is interrupted while a web service application is being executed, by performing appropriate exception handling, inconvenience to the user during use can be suppressed. In addition, even when the portable terminal apparatus is changed to a different model, it is unnecessary to change the application programs on the side of the central apparatus, so that the number of man-hours necessary for maintenance can be reduced and the physical restriction on the portable terminal apparatus adopted by the data communication system can be relieved. Consequently, extensions, modifications and the like of the system are facilitated.

According to the second aspect, the central apparatus stores in the database in advance the communication control data associated with the environment data identifying the communication environment of the portable terminal apparatus. The communication control data means information identifying the exception handling for a case where communication is interrupted or the like. The central apparatus receives the environment data from the portable terminal apparatus, extracts the communication control data based on the received environment data, adds the extracted communication control data to the display screen definition data, and transmits it to the portable terminal apparatus. Thereby, the central apparatus having received the environment data such as the information on the model, the information on the carrier, the information on the communication protocol and the information on the communication control from the portable terminal apparatus can reliably extract the communication control data corresponding to the environment data, so that the portable terminal apparatus can execute the most suitable exception handling corresponding to the environment data.

According to the third aspect, the communication control data includes information to specify the image displayed on the portable terminal apparatus from the start to end of the communication between the portable terminal apparatus and the central apparatus. Thereby, even during the execution of the application to perform data communication, a different application can be executed asynchronously, and for example, by executing the different application during the retry processing of the data communication, the user convenience improves.

According to the fourth aspect, the relay apparatus receives from the central apparatus the display screen definition data to set the format of the screen displayed on the portable terminal apparatus, adds to the display screen definition data the communication control data where the exception handling procedure for the communication between the portable terminal apparatus and the central apparatus is set, and transmits the display screen definition data to which the communication control data is added, to the portable terminal apparatus. By performing data communication through the relay apparatus, the communication control data can be added to the display screen definition data at the relay apparatus and the number of retries at the time of the occurrence of a communication anomaly and the time interval between the retries can be determined without any change of the communication program executed by the already-existing central apparatus. Consequently, for example, even when the communication is interrupted while a web service application is being executed, appropriate exception handling can be executed, and the physical restriction on the portable terminal apparatus adopted by the data communication system can be relieved, so that extensions, modifications and the like associated with the communication operation of the system are facilitated only by changing the communication control data included in the display screen definition data without any redevelopment or change of the program.

According to the fifth aspect, the portable terminal apparatus receives the display screen definition data defining the displayed image from the outside, extracts from the display screen definition data the communication control data where the exception handling procedure for the data communication is set, and performs the data communication with the outside according to the extracted communication control data. Thereby, for example, the number of retries at the time of the occurrence of a communication anomaly and the time interval between the retries can be determined according to the communication control data included in the display screen definition data received from the outside, so that the most suitable exception handling can be executed with no attention paid to the specifications of the application program constructed on the central apparatus.

According to the first aspect, the portable terminal apparatus can determine the number of retries at the time of the occurrence of a communication anomaly and the time interval between the retries according to the communication control data added to the display screen definition data received for displaying images, and for example, even when the communication is interrupted while a web service application is being executed, by performing appropriate exception handling, inconvenience to the user during use can be suppressed. In addition, even when the portable terminal apparatus is changed to a different model, it is unnecessary to change the application programs on the side of the central apparatus, so that the number of man-hours necessary for maintenance can be reduced and the physical restriction on the portable terminal apparatus adopted by the data communication system can be relieved. Consequently, extensions, modifications and the like of the system are facilitated.

According to the second aspect, the central apparatus having received the environment data such as the information on the model, the information on the carrier, the information on the communication protocol and the information on the communication control from the portable terminal apparatus can reliably extract the communication control data corresponding to the environment data, so that the portable terminal apparatus can execute the most suitable exception handling corresponding to the environment data.

According to the third aspect, even during the execution of the application to perform data communication, a different application can be executed asynchronously, and for example, by executing the different application during the retry processing of the data communication, the user convenience improves.

According to the fourth aspect, by performing data communication through the relay apparatus, the communication control data can be added to the display screen definition data at the relay apparatus and the number of retries at the time of the occurrence of a communication anomaly and the time interval between the retries can be determined without any change of the communication program executed by the already-existing central apparatus. Consequently, for example, even when the communication is interrupted while a web service application is being executed, appropriate exception handling can be executed, and the physical restriction on the portable terminal apparatus adopted by the data communication system can be relieved, so that extensions, modifications and the like associated with the communication operation of the system are facilitated only by changing the communication control data included in the display screen definition data without any redevelopment or change of the program.

According to the fifth aspect, for example, the number of retries at the time of the occurrence of a communication anomaly and the time interval between the retries can be determined according to the communication control data included in the display screen definition data received from an external application server or the like, so that the most suitable exception handling can be executed without concern for the specifications of the application program constructed on the central apparatus.

The above and further objects and features of the invention will more fully be apparent from the following detailed description with accompanying drawings.

BRIEF DESCRIPTION OF THE SEVERAL VIEWS OF THE DRAWINGS

FIG. 3 is a view showing an example of HTML sentences (display screen definition data) defining a web screen displayed on the mobile telephone of the data communication system according to the first embodiment of the present invention;

FIG. 4 is a view showing an example of HTML sentences as the display screen definition data in the data communication system according to the first embodiment of the present invention;

FIG. 6 is a view showing an example of the structure of the data stored in a communication control data storage unit;

FIG. 10 is a view showing an example of HTML sentences as the display screen definition data in a data communication system according to a third embodiment of the present invention.

DETAILED DESCRIPTION OF THE INVENTION

The present invention will be described in detail based on the drawings showing embodiments thereof.

(First Embodiment)

Figure 1:
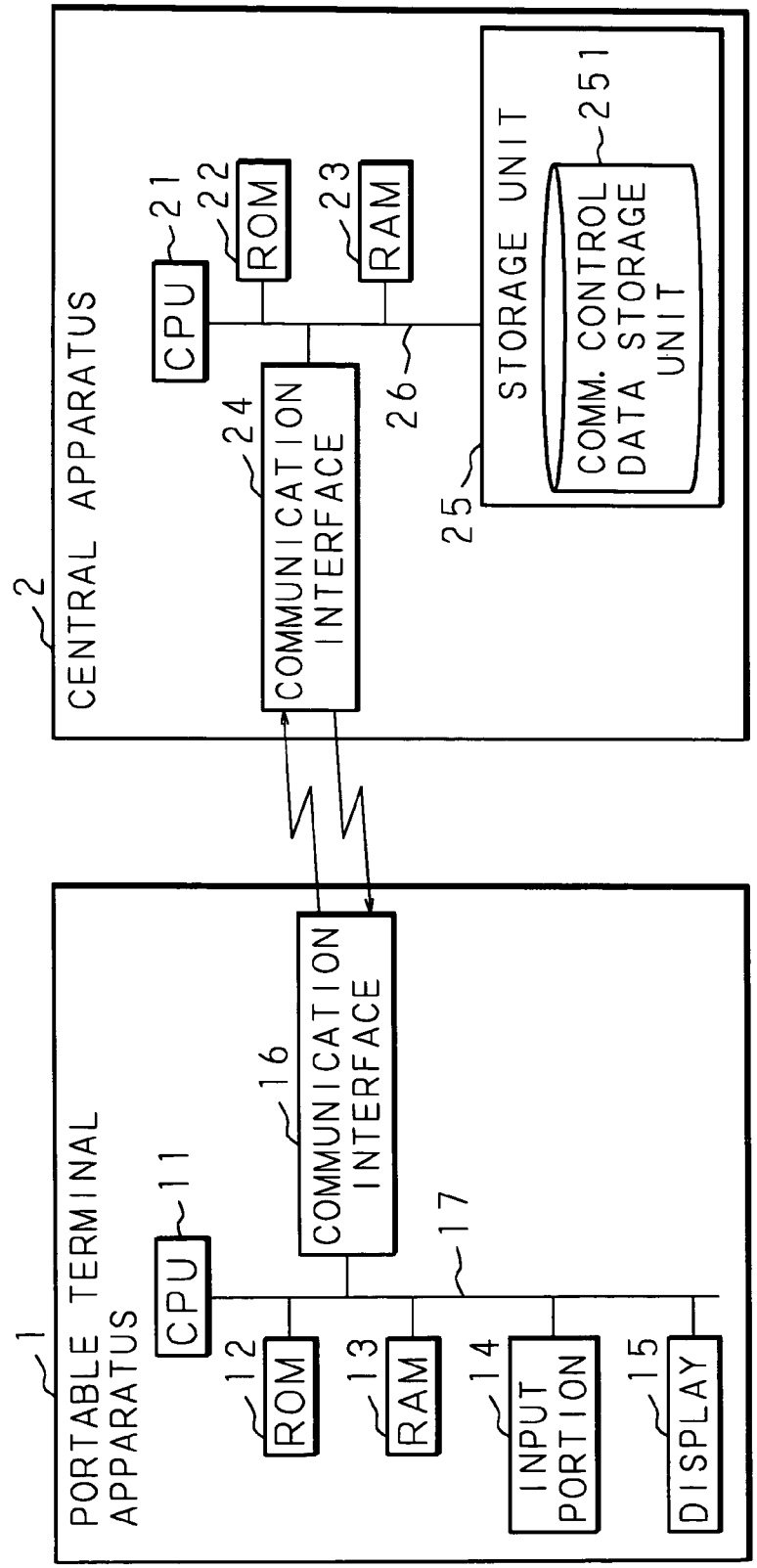
FIG. 1 is a block diagram showing the structure of a data communication system according to a first embodiment of the present invention.

A data communication system according to a first embodiment of the present invention will be described in detail with reference to the drawings. FIG. 1 is a block diagram showing the structure of the data communication system according to the first embodiment of the present invention. The data communication system according to the first embodiment of the present invention comprises a mobile portable terminal apparatus 1 and a central apparatus 2 that provides the portable terminal apparatus 1 with applications.

The portable terminal apparatus 1 is provided with at least: a CPU 11; a ROM 12; a RAM 13; an input portion 14 that accepts data input; a display 15 that displays images; and a communication interface 16 capable of data communication with the central apparatus 2.

The CPU 11, which is connected to the above-mentioned hardware portions of the portable terminal apparatus 1 through an internal bus 17, controls the hardware portions, and executes various software functions according to processing programs stored in the ROM 12 such as a program to receive the display screen definition data, a program to extract the communication control data that identifies the exception handling from the received display screen definition data, and a program to execute the exception handling by interpreting the communication control data.

The ROM 12 comprises a flash memory or the like, and stores processing programs necessary for causing the apparatus to function as the portable terminal apparatus 1. The RAM 13 comprises an SRAM or the like, and stores temporary data generated when software is executed. The communication interface 16 receives the display screen definition data defining the display screen, and transmits the data the input of which is accepted through the display screen. While in the first embodiment, the communication with the central apparatus 2 through the communication interface 16 is wireless communication, it may be wired communication through a LAN or WAN cable or the like.

The input portion 14 accepts data input through the display screen. For example, when the portable terminal apparatus 1 is a mobile telephone, the input portion 14 corresponds to the input buttons. The display 15 is a liquid crystal display panel or the like that displays images according to the received display screen definition data. For example, when the portable terminal apparatus 1 is a mobile telephone, the display screen definition data is tag data such as XFORM data and HTML data, and the CPU 11 of the portable terminal apparatus 1 displays the image on the liquid crystal display panel by interpreting the tag data.

The central apparatus 2 is provided with at least: a CPU 21; a ROM 22; a RAM 23; a communication interface 24 capable of data communication with the portable terminal apparatus 1; and a storage unit (storage means) 25 such as a hard disk storing application programs and display screen definition data according to the application programs.

The CPU 21, which is connected to the above-mentioned hardware portions of the central apparatus 2 through an internal bus 26, controls the hardware portions, and executes various software functions according to processing programs stored in the ROM 22 such as a program to receive environment data which is information on the communication environment of the portable terminal apparatus 1, a program to add the communication control data to the display screen definition data based on the received environment data, and a program to transmit the communication control data to the portable terminal apparatus 1.

The ROM 22 comprises a flash memory or the like, and stores processing programs necessary for causing the apparatus to function as the central apparatus 2. The RAM 23 comprises an SRAM or the like, and stores temporary data generated when software is executed. The communication interface 24 transmits the display screen definition data defining the display screen of the portable terminal apparatus 1. While in the first embodiment, the communication with the portable terminal apparatus 1 through the communication interface 24 is wireless communication, it may be wire communication through a LAN or WAN cable or the like in which communication is not stable.

The storage unit 25 is a fixed storage device such as a hard disk, and has a communication control data storage unit 251 as a database in which the communication control data defining the exception handling performed when a communication anomaly occurs is stored so as to be associated with the environment data identifying the communication environment such as identification information to identify the portable terminal apparatus 1 and identification information to identify the communication carrier.

The processing procedure in the data communication system according to the first embodiment will be described by using as an example a web communication such as the i-mode (trademark) service using a mobile telephone 1a as the portable terminal apparatus 1. The present invention is not limited to the web communication, and may be applied to any application that displays images based on display screen definition data.

Figure 2:
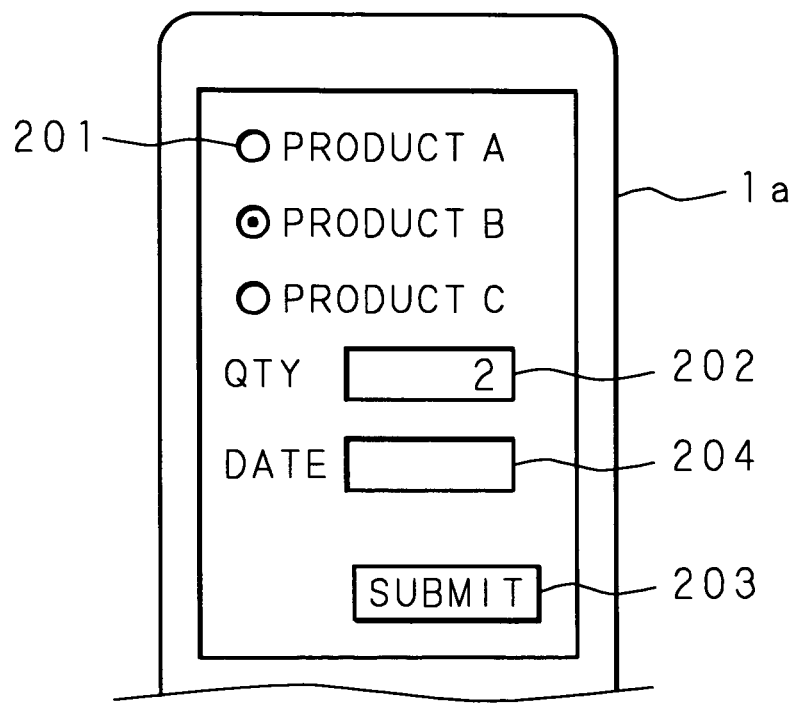
FIG. 2 is a view illustrating a web screen displayed on a mobile telephone of the data communication system according to the first embodiment of the present invention.

FIG. 2 is a view illustrating a web screen displayed on the mobile telephone 1a of the data communication system according to the first embodiment of the present invention. As shown in FIG. 2, the display screen of the mobile telephone 1a shows an example of a delivery date confirmation application where the earliest possible delivery date is displayed when a product is selected, the quantity is inputted and the data is transmitted.

In FIG. 2, a product to be ordered, for example, the product B is selected from among a plurality of products by using a radio button 201, and the quantity is inputted to an input area 202. Then, when a transmission button 203 is selected, the web communication with the central apparatus 2 is established, the inputted data is transmitted, and the delivery date information of the product B is received as HTML sentences. A screen similar to FIG. 2 is displayed based on the received HTML sentences, and the earliest delivery date is displayed in a format such as XX/XX/XX on an output area 204.

The HTML sentences which are the display screen definition data transmitted from the central apparatus 2 are, for example, as shown in FIG. 3. FIG. 3 is a view showing an example of the HTML sentences (display screen definition data) defining a web screen displayed on the mobile telephone 1a of the data communication system according to the first embodiment of the present invention. As shown in FIG. 3, the HTML sentences describe that the inputted data is transmitted to the outside when the transmission button 203 in FIG. 2 is selected.

Although the HTML sentences shown in FIG. 3 define data transmission as a function of the transmission button 203, they do not define other pieces of communication control data. Therefore, the exception handling performed, for example, when the mobile telephone 1a is changed to a different model or when communication is interrupted due to weak radio waves depends on the application programs stored in the storage unit 25 of the central apparatus 2.

Accordingly, the first embodiment is characterized in that, as shown in FIG. 4, the definition information on the exception handling is added at the point of time when the display screen definition data is transmitted from the central apparatus 2. FIG. 4 is a view showing an example of HTML sentences as the display screen definition data in the data communication system according to the first embodiment of the present invention. As shown in FIG. 4, communication control data 41 is added to the HTML sentences by the central apparatus 2, and the exception handling is performed by the mobile telephone 1a.

In the example of FIG. 4, "retry" and "interval" are inserted as the communication control data. The data "retry" is tag data representative of the number of times a transmission retry is performed when the communication is ceased. The data "interval" is tag data representative of the time interval at which the transmission retry is performed when the communication is ceased.

Figure 5:
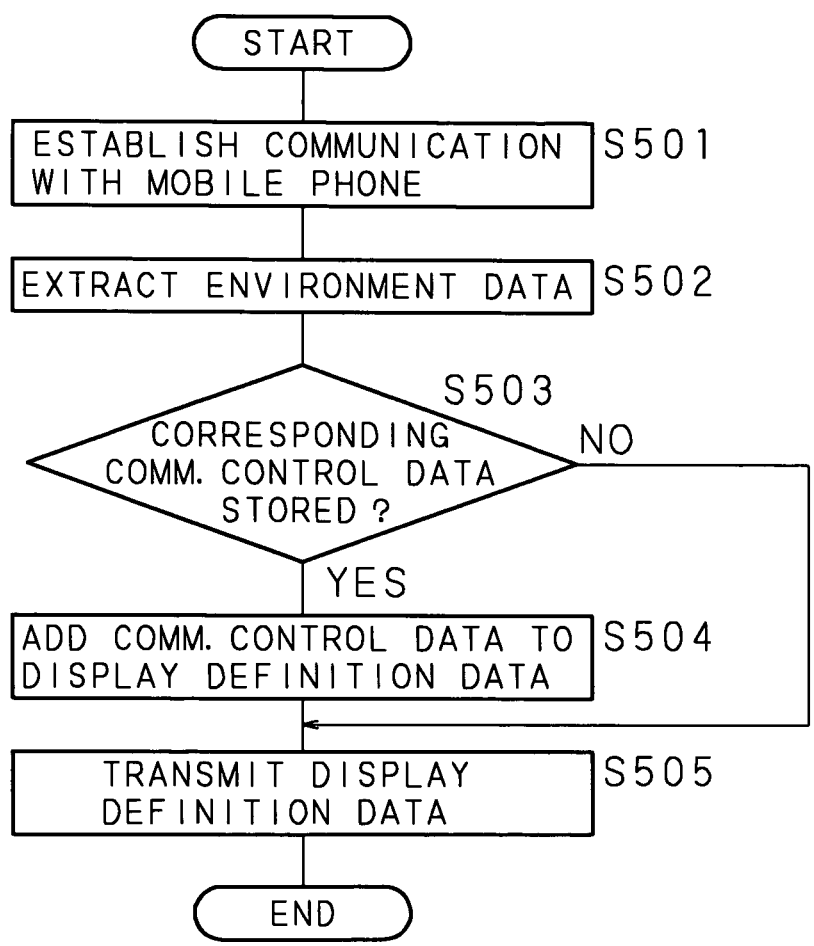
FIG. 5 is a flowchart showing the processing procedure of the CPU of a central apparatus of the data communication system according to the first embodiment of the present invention.

The CPU 21 of the central apparatus 2 adds the communication control data to the display screen definition data by the following processing procedure: FIG. 5 is a flowchart showing the processing procedure of the CPU 21 of the central apparatus 2 of the data communication system according to the first embodiment of the present invention. When an application program stored in the storage unit 25 of the central apparatus 2 is executed by the mobile telephone 1a, first, the CPU 21 of the central apparatus 2 establishes communication with the mobile telephone 1a (step S501).

The header information of the data transmitted and received between these apparatuses when communication is established includes environment data such as identification information to identify the mobile telephone 1a and identification information to identify the communication carrier. Moreover, the CPU 21 of the central apparatus 2 is capable of obtaining, as the environment data, the information on the communication environment such as the number of retries performed until the establishment of the communication. Therefore, with reference to the header information of the received data, the CPU 21 extracts the environment data (step S502), and determines whether the communication control data corresponding to the extracted environment data is stored in the communication control data storage unit 251 of the storage unit 25 or not (step S503).

FIG. 6 is a view showing an example of the structure of the data stored in the communication control data storage unit 251 as the database. As shown in FIG. 6, the values of "retry" representative of the number of times the transmission retry is performed when the communication is ceased and "interval" representative of the time interval at which the transmission retry is performed when the communication is ceased are stored so as to be associated with the model ID which is the identification information to identify the model of the mobile telephone being used. The environment data serving as the key information is not particularly limited to the model ID of the mobile telephone, and the communication control data is not limited to "retry" and "interval." While FIG. 6 shows an example in which the communication control data is associated with each model of the mobile telephone 1a, the present invention is not specifically limited thereto, and the data may be stored so as to be associated with the position information of the mobile telephone 1a obtained from the carrier running the mobile telephone network or the GPS (Global Positioning System) and the information (environment data) representative of the communication condition of the mobile telephone 1a such as the remaining battery power of the mobile telephone and the radio wave intensity of the mobile telephone.

Even when the model of the mobile telephone 1a and the carrier providing the mobile telephone network are the same, the communication condition sometimes differs according to the location and the environment where the mobile telephone 1a is used, and by obtaining the position information, the radio wave intensity and the like and extracting the communication control data associated with the obtained position information, radio wave intensity and the like from the communication control data storage unit, more appropriate communication control data can be set according to the communication environment where the mobile telephone 1a is used and the fluctuations in the communication environment. Since there are cases where the position information by the GPS, the remaining battery power of the mobile telephone and the radio wave intensity of the mobile telephone are not included in the header information, notification of these pieces of information may be provided by identifiably inserting them into the request message at the point of time when the mobile telephone 1a requests the central apparatus 2 to execute the web application.

When the CPU 21 determines that the communication control data corresponding to the extracted environment data is not stored in the communication control data storage unit 251 of the storage unit 25 (step S503: NO), the CPU 21 skips the process to step S505 without adding the communication control data to the display screen definition data (HTML sentences). When the CPU 21 determines that the communication control data corresponding to the extracted environment data is stored in the communication control data storage unit 251 of the storage unit 25 (step S503: YES), the CPU 21 extracts the stored communication control data, and adds it to the display screen definition data (step S504). The CPU 21 transmits the display screen definition data to the mobile telephone 1a (step S505), and enters a state of waiting for data reception from the mobile telephone 1a through the display screen.

Figure 7:
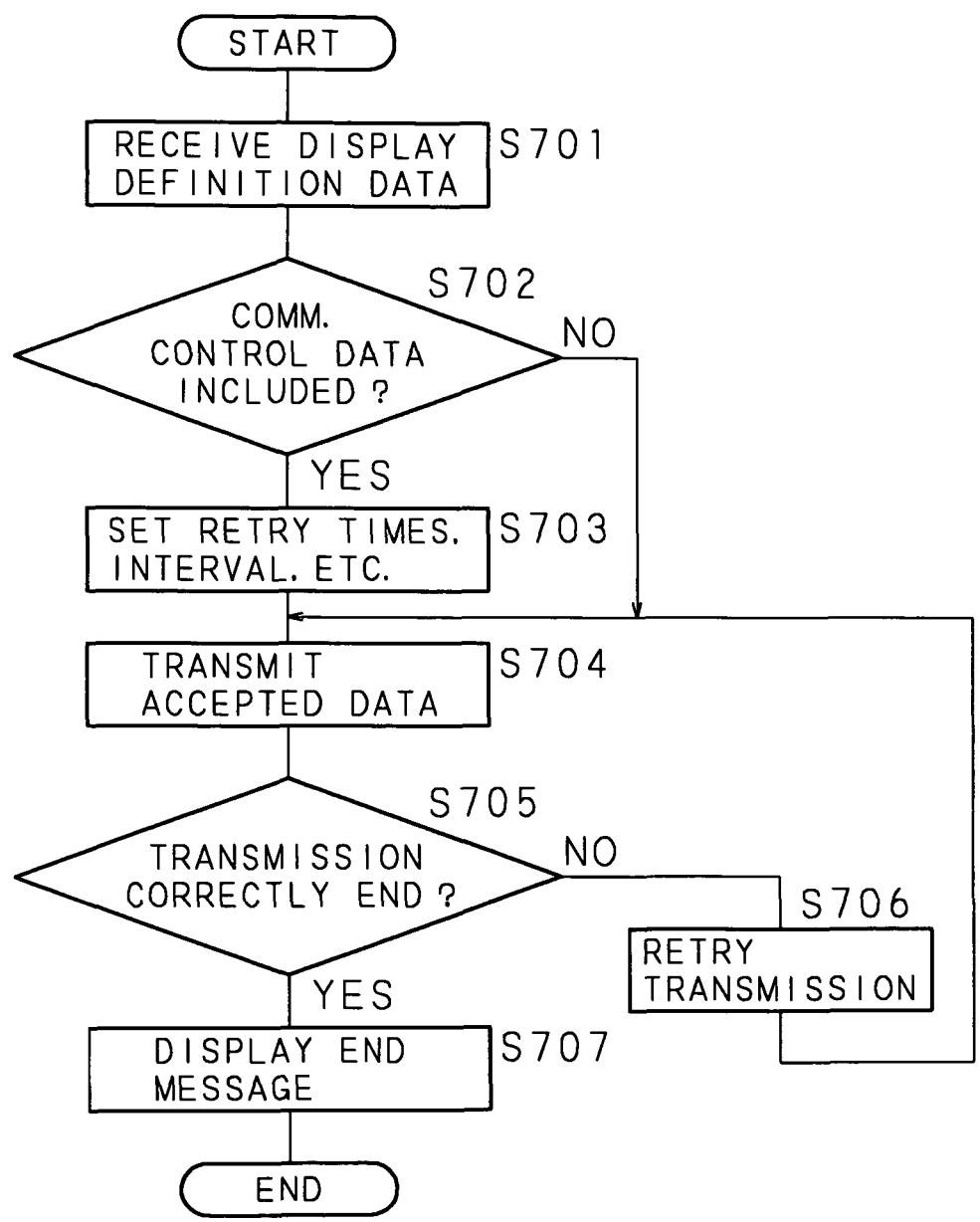
FIG. 7 is a flowchart showing the processing procedure of the CPU of a mobile telephone of the data communication system according to the first embodiment of the present invention.

The CPU 11 of the mobile telephone 1a having received the display screen definition data executes the following processing: FIG. 7 is a flowchart showing the processing procedure of the CPU 11 of the mobile telephone 1a of the data communication system according to the first embodiment of the present invention.

The CPU 11 of the mobile telephone 1a receives the display screen definition data from the central apparatus 2 (step S701). The CPU 11 determines whether the communication control data is included in the received display screen definition data or not (step S702). When the CPU 11 determines that the communication control data is not included in the received display screen definition data (step S702: NO), the CPU 11 performs no exception handling, and determining that a restart is performed by the user's manual operation or a retry is performed, skips the process to step S704.

When the CPU 11 determines that the communication control data is included in the received display screen definition data (step S702: YES), the CPU 11 extracts the communication control data, and sets the number of transmission retries and the time interval between the transmission retries (step S703). The CPU 11 transmits the data accepted through the display screen to the central apparatus 2 (step S704).

The CPU 11 determines whether the data transmission ends normally or not (step S705). When the CPU 11 determines that the data transmission ends abnormally (step S705: NO), the CPU 11 performs retry processing according to the set exception handling (step S706), and returns the process to step S704. When the CPU 11 determines that the data transmission ends normally (step S705: YES), the CPU 11 displays the normal end message on the display 15 (step S707).

As described above, according to the first embodiment, the portable terminal apparatus 1 can determine the number of retries at the time of the occurrence of a communication anomaly and the time interval between the retries according to the communication control data added to the display screen definition data received for displaying images. Consequently, it is unnecessary for the user to manually perform retry processing, so that inconvenience during use can be avoided. In addition, even when the portable terminal apparatus 1 is changed to a different model, it is unnecessary to change the application programs on the side of the central apparatus 2, so that the number of man-hours necessary for maintenance can be reduced and the physical restriction on the portable terminal apparatus 1 adopted by the data communication system can be relieved. Consequently, extensions, modifications and the like of the system are facilitated.

Further, the central apparatus 2 having received the environment data such as the information on the model, the information on the carrier, the information on the communication protocol and the information on the communication control from the portable terminal apparatus 1 can reliably extract the communication control data corresponding to the environment data, so that the portable terminal apparatus 1 can execute the most suitable exception handling corresponding to the environment data.

(Second Embodiment)

Figure 8:
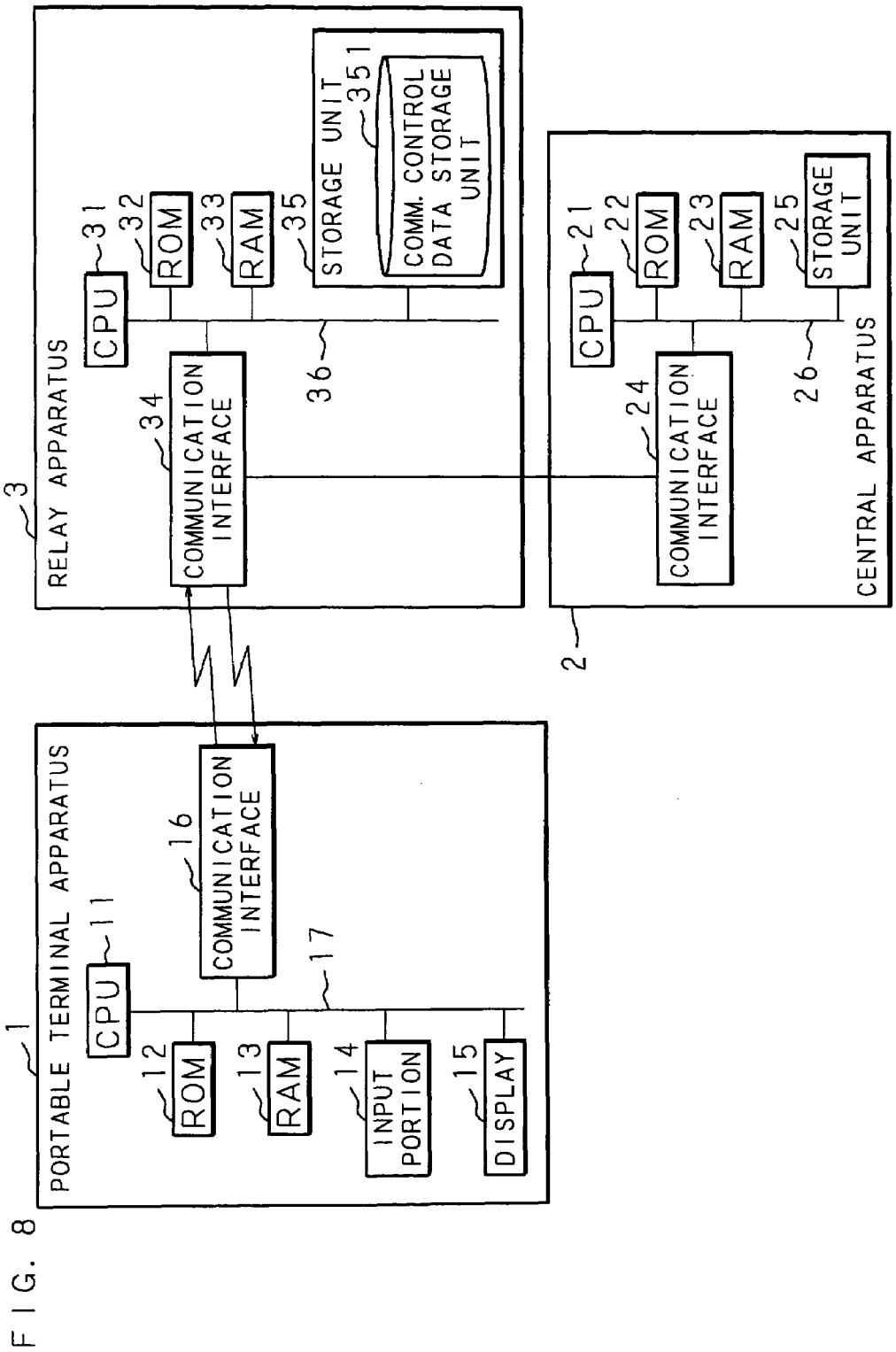
FIG. 8 is a block diagram showing the structure of a data communication system according to a second embodiment of the present invention.

A data communication system according to a second embodiment of the present invention will be described in detail with reference to the drawings. FIG. 8 is a block diagram showing the structure of the data communication system according to the second embodiment of the present invention. The data communication system according to the second embodiment of the present invention comprises a mobile portable terminal apparatus 1, a central apparatus 2 that provides the portable terminal apparatus 1 with applications, and a relay apparatus 3 that relays the data communication between the portable terminal apparatus 1 and the central apparatus 2.

The portable terminal apparatus 1 is provided with at least: a CPU 11; a ROM 12; a RAM 13; an input portion 14 that accepts data input; a display 15 that displays images; and a communication interface 16 capable of data communication with the relay apparatus 3.

The CPU 11, which is connected to the above-mentioned hardware portions of the portable terminal apparatus 1 through an internal bus 17, controls the hardware portions, and executes various software functions according to processing programs stored in the ROM 12 such as a program to receive the display screen definition data, a program to extract the communication control data that identifies the exception handling from the received display screen definition data, and a program to execute the exception handling by interpreting the communication control data.

The ROM 12 comprises a flash memory or the like, and stores processing programs necessary for causing the apparatus to function as the portable terminal apparatus 1. The RAM 13 comprises an SRAM or the like, and stores temporary data generated when software is executed. The communication interface 16 receives the display screen definition data defining the display screen, and transmits the data the input of which is accepted through the display screen. While in the second embodiment, the communication with the relay apparatus 3 through the communication interface 16 is wireless communication, it may be wired communication through a LAN or WAN cable or the like.

The input portion 14 accepts data input through the display screen. For example, when the portable terminal apparatus 1 is a mobile telephone, the input portion 14 corresponds to the input buttons. The display 15 is a liquid crystal display panel or the like that displays images according to the received display screen definition data. For example, when the portable terminal apparatus 1 is a mobile telephone, the display screen definition data is tag data such as XFORM data and HTML data, and the CPU 11 of the portable terminal apparatus 1 displays images on the liquid crystal display panel by interpreting the tag data.

The central apparatus 2 is provided with at least: a CPU 21; a ROM 22; a RAM 23; a communication interface 24 capable of data communication with the relay apparatus 3; and a storage unit (storage means) 25 such as a hard disk storing application programs and display screen definition data according to the application programs.

The CPU 21, which is connected to the above-mentioned hardware portions of the central apparatus 2 through an internal bus 26, controls the hardware portions, and executes various software functions according to processing programs stored in the ROM 22 such as a program to receive the environment data which is information on the communication environment of the portable terminal apparatus 1, a program to add the communication control data to the display screen definition data based on the received environment data, and a program to transmit the communication control data to the relay apparatus 3.

The ROM 22 comprises a flash memory or the like, and stores processing programs necessary for causing the apparatus to function as the central apparatus 2. The RAM 23 comprises an SRAM or the like, and stores temporary data generated when software is executed. The communication interface 24 transmits the display screen definition data to the relay apparatus 3. While in the second embodiment, it is to be noted that the communication with the relay apparatus 3 through the communication interface 24 is wired communication through a LAN cable or the like, it may be a wireless communication. The storage unit 25 is a fixed storage device such as a hard disk, and stores application programs and a program to generate the communication control data defining the exception processing performed when a communication anomaly occurs.

The relay apparatus 3 is provided with at least: a CPU 31; a ROM 32; a RAM 33; a communication interface 34 capable of data communication between the portable terminal apparatus 1 and the central apparatus 2; and a storage unit (storage means) 35 such as a hard disk having a communication control data storage unit 351 as a database in which communication control data defining the exception handling performed when a communication anomaly occurs is stored so as to be associated with the environment data identifying the communication environment such as identification information to identify the portable terminal apparatus 1 and identification information to identify the communication carrier.

The CPU 31, which is connected to the above-mentioned hardware portions of the relay apparatus 3 through an internal bus 36, controls the hardware portions, and executes various software functions according to processing programs stored in the ROM 32 such as a program to receive the environment data which is information on the communication environment of the portable terminal apparatus 1, a program to receive the display screen definition data from the central apparatus 2, a program to add the communication control data to the display screen definition data based on the received environment data, and a program to transmit the communication control data to the portable terminal apparatus 1.

The ROM 32 comprises a flash memory or the like, and stores processing programs necessary for causing the apparatus to function as the relay apparatus 3. The RAM 33 comprises an SRAM or the like, and stores temporary data generated when software is executed. The communication interface 34 transmits the display screen definition data defining the display screen. While in the second embodiment, the communication with the portable terminal apparatus 1 through the communication interface 34 is wireless communication, and the communication with the central apparatus 2 is wired communication through a LAN or WAN cable or the like.

The storage unit 35 is a fixed storage device such as a hard disk, and has the communication control data storage unit 351 in which the communication control data defining the exception handling performed when a communication anomaly occurs is stored so as to be associated with the environment data identifying the communication environment such as the identification information to identify the portable terminal apparatus 1 and the identification information to identify the communication carrier. The structure of the data stored in the communication control data storage unit 351 as a database is similar to that of the communication control data storage unit 251 of the first embodiment.

The processing procedure in the data communication system according to the second embodiment will be described by using as an example a web communication such as the i-mode (trademark) service using a mobile telephone 1a as the portable terminal apparatus 1. The present invention is not limited to the web communication, and may be applied to any application that displays images based on display screen definition data.

Figure 9:
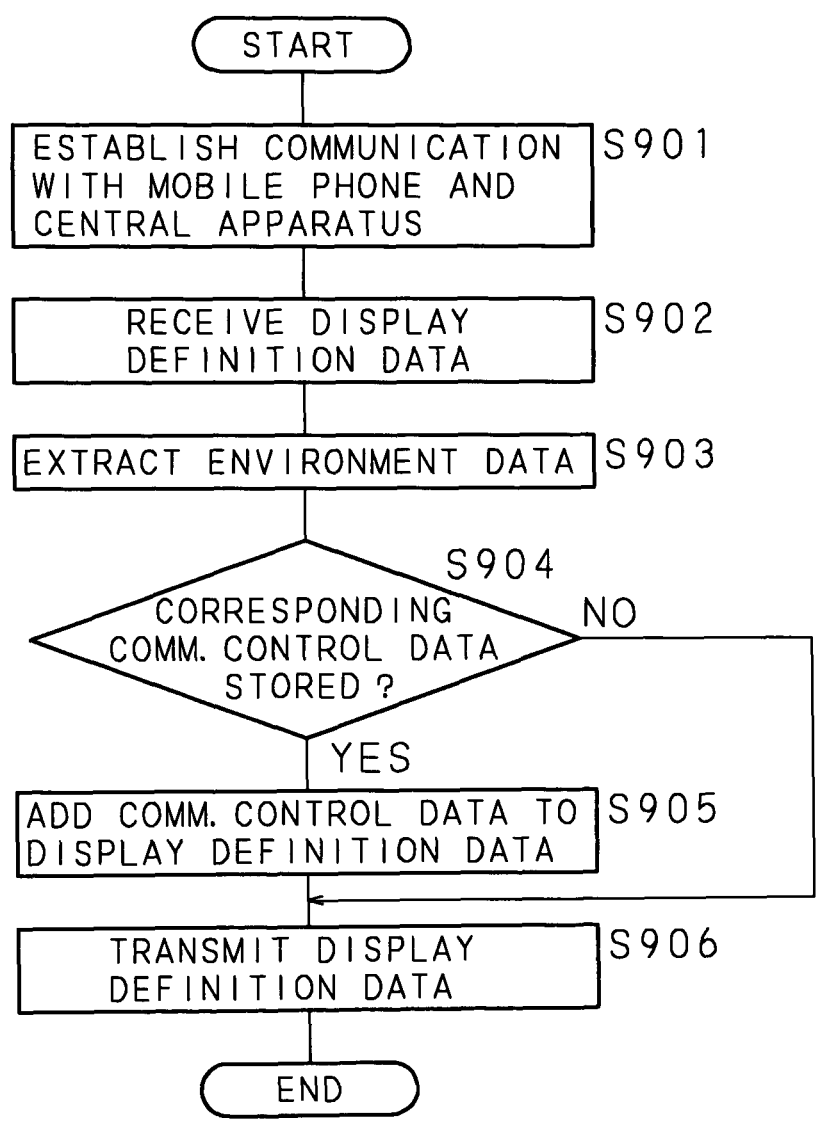
FIG. 9 is a flowchart showing the processing procedure of the CPU of a relay apparatus of the data communication system according to the second embodiment of the present invention.

In the second embodiment, the CPU 31 of the relay apparatus 3 adds the communication control data to the display screen definition data by the following processing procedure: FIG. 9 is a flowchart showing the processing procedure of the CPU 31 of the relay apparatus 3 of the data communication system according to the second embodiment of the present invention. When an application program stored in the storage unit 25 of the central apparatus 2 is executed by the mobile telephone 1a, first, the CPU 31 of the relay apparatus 3 establishes communication with the mobile telephone 1a and the central apparatus 2 (step S901). The CPU 31 receives the display screen definition data defining the image displayed on the mobile telephone 1a from the central apparatus 2 (step S902).

The header information of the data transmitted and received between these apparatuses when communication is established includes environment data such as identification information to identify the mobile telephone 1a and identification information to identify the communication carrier. The CPU 31 of the relay apparatus 3 is also capable of obtaining, as the environment data, the information on the communication environment such as the number of retries performed until the establishment of the communication. Therefore, with reference to the header information of the data received from the mobile telephone 1a, the CPU 31 extracts the environment data (step S903), and determines whether the communication control data corresponding to the extracted environment data is stored in the communication control data storage unit 351 of the storage unit 35 or not (step S904).

When the CPU 31 determines that the communication control data corresponding to the extracted environment data is not stored in the communication control data storage unit 351 of the storage unit 35 (step S904: NO), the CPU 31 skips the process to step S906 without adding the communication control data to the display screen definition data (HTML sentences). When the CPU 31 determines that the communication control data corresponding to the extracted environment data is stored in the communication control data storage unit 351 of the storage unit 35 (step S904: YES), the CPU 31 extracts the stored communication control data, and adds it to the display screen definition data (step S905). The CPU 31 transmits the display screen definition data to the mobile telephone 1a (step S906), and enters a state of waiting for data reception from the mobile telephone 1a through the display screen.

The CPU 11 of the mobile telephone 1a having received the display screen definition data executes similar processing to that of the first embodiment, and transmits the data accepted through the input portion 14.

As described above, according to the second embodiment, by transmitting data by way of the relay apparatus 3, the communication control data can be added to the display screen definition data at the relay apparatus 3 and the number of retries at the time of the occurrence of a communication anomaly and the time interval between the retries can be determined without any change of the communication program executed by the already-existing central apparatus 2. Consequently, for example, even when the communication is interrupted while a web service application is being executed, appropriate exception handling can be executed, and the physical restriction on the portable terminal apparatus 1 adopted by the data communication system can be relieved, so that extensions, modifications and the like associated with the communication operation of the system are facilitated only by changing the communication control data included in the display screen definition data without any redevelopment or change of the program.

(Third Embodiment)

A data communication system according to a third embodiment of the present invention will be described in detail with reference to the drawings. Since the structure of the data communication system according to the third embodiment of the present invention is similar to that of the first or second embodiment, a detailed description thereof is omitted by using the same reference numerals. The third embodiment is different from the first or second embodiment in that information to specify the image displayed on the portable terminal apparatus 1 from the start to end of communication between the portable terminal apparatus 1 and the central apparatus 2 is included as the communication control data.

FIG. 10 is a view showing an example of HTML sentences as the display screen definition data in the data communication system according to the third embodiment of the present invention. As shown in FIG. 10, in addition to the communication control data 41 added in the first embodiment, new pieces of communication control data 51 and 52 are added to the HTML sentences, and the exception handling is performed by the mobile telephone 1a. It may be either the central apparatus 2 or the relay apparatus 3 that adds the new pieces of communication control data 51 and 52 to the HTML sentences.

In the example of FIG. 10, "async," "onSendUrl," and "onResponseUrl" are inserted as the new pieces of communication control data. The data "async" is tag data specifying whether to perform an asynchronous communication or not, and when the specification is "true," an asynchronous communication is executable. The data "onSendUrl" is tag data specifying the display screen for data transmission, and specifies, for example, a URL name. The data "onResponseUrl" is tag data specifying the display screen displayed when data transmission is completed, and specifies, for example, a URL name.

Figure 11:
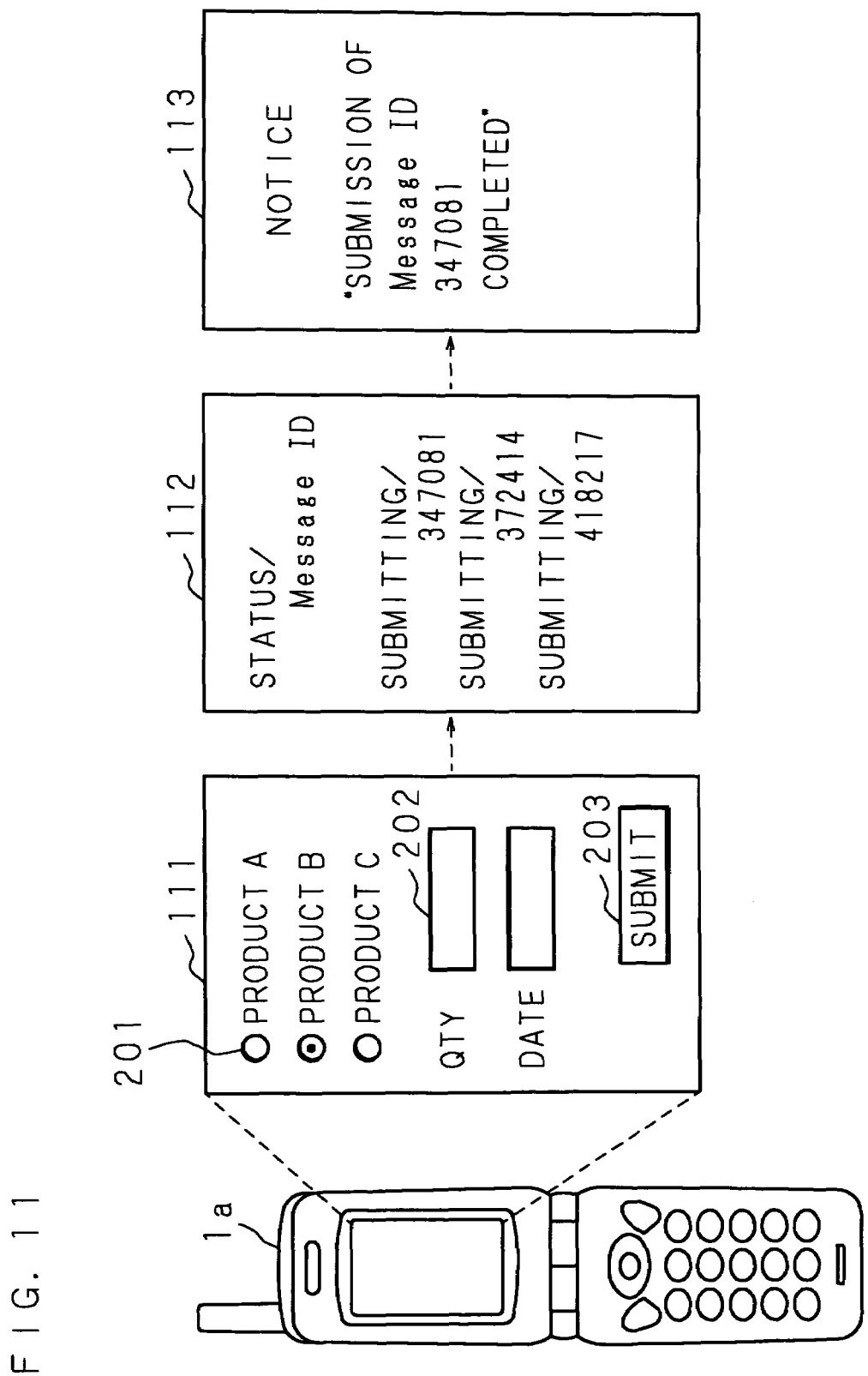
FIG. 11 is a view showing an example of the screen transition of the mobile telephone when information to specify the image displayed on the mobile telephone from the start to end of data communication is added to the communication control data.

FIG. 11 is a view showing an example of the screen transition of the mobile telephone 1a when information to specify the image displayed on the mobile telephone 1a from the start to end of data communication is added to the communication control data. As shown in FIG. 11, the mobile telephone 1a displays a screen 111 according to the display screen definition data at the start of execution of the application.

Then, when the user selects a radio button 201, inputs a number in the input area 202 and selects the transmission button 203, data communication with the central apparatus 2 (or the relay apparatus 3) is started. When as the communication control data, the specification of "async" is "true," the mobile telephone 1a performs an asynchronous communication, and during the data communication, a screen 112 specified by "onSendUrl" is displayed. The user can confirm that the data transmission is in progress by the screen display.

When the data communication is completed, the mobile telephone 1a displays a screen 113 specified by "onResponseUrl" of the communication control data, so that the user can confirm the completion of the data transmission. FIG. 11 shows an example of the screen display when a plurality of data communications are executed and one of them is completed. When the communication is not an asynchronous communication, the data transmission completion message like the screen 113 cannot be displayed during the execution of even one data communication. By thus performing the asynchronous communication according to the communication control data without updating the application of the central apparatus 2, the user convenience is significantly improved.

As described above, according to the third embodiment, even during the execution of the application to perform data communication, a different application can be executed asynchronously, and for example, by executing the different application during the retry processing of the data communication, the user convenience is enhanced.

In the above-described third embodiment, the specification of a screen transition according to the environment data may be enabled. In this case, the values of "async" specifying whether to perform an asynchronous communication or not, "onSendUrl" specifying the display screen for data transmission and "onResponseUrl" specifying the display screen for the completion of data transmission are stored in the communication control data storage unit 251 of the central apparatus 2 or in the communication control data storage unit 351 of the relay apparatus 3 so as to be associated with an identification ID which is the identification information to identify the mobile telephone being used. It is to be noted that the environment data serving as the key information is not specifically limited to the identification ID of the mobile telephone and that the communication control data is not limited to "async," "ouSendUrl," and "onResponseUrl."

The central apparatus 2 or the relay apparatus 3 determines whether the communication control data corresponding to the received environment data is stored in the communication control data storage unit 251 or the communication control data storage unit 351, and when it is stored, adds the corresponding communication control data to the display screen definition data and transmits it to the portable terminal apparatus 1. Thereby, an appropriate screen can be displayed according to the communication status and the like of the portable terminal apparatus 1, so that the user convenience can be improved.

As this invention may be embodied in several forms without departing from the spirit of essential characteristics thereof, the present embodiments are therefore illustrative and not restrictive, since the scope of the invention is defined by the appended claims rather than by description preceding them, and all changes that fall within metes and bounds of the claims, or equivalence of such metes and bounds thereof are therefore intended to be embraced by the claims.

What is claimed is:

1. A relay apparatus that relays data communication between a portable terminal apparatus having a display for displaying an image and a central apparatus, the relay apparatus comprising:
a database storing communication control data in association with environment data identifying a position information of the portable terminal apparatus; and
a controller capable of performing an operation of:
receiving display screen definition data from the central apparatus which defines the image displayed on the display of the portable terminal apparatus;
receiving environment data from the portable terminal apparatus;
extracting communication control data, corresponding to the received environment data, from the database;
adding the extracted communication control data to the received display screen definition data; and
transmitting the display screen definition data, into which the extracted communication control data is added, to the portable terminal apparatus,
wherein the transmitted communication control data represents a setting of an exception handling procedure for the data communication between the portable terminal apparatus and the central apparatus,
wherein the communication control data stored in the database represents the exception handling procedure, and
wherein the portable terminal apparatus performs the setting of the exception handling procedure.

2. A relay apparatus according to claim 1, wherein the communication control data includes information to specify an image displayed on said portable terminal apparatus from start to end of the communication between said portable terminal apparatus and said central apparatus.

3. A relay apparatus that relays data communication between a portable terminal apparatus having a display for displaying an image and a central apparatus, the relay apparatus comprising:
a database storing communication control data in association with environment data identifying a position information of the portable terminal apparatus; and
receiving display screen definition data from the central apparatus, which defines the image displayed on the display of the portable terminal apparatus;
receiving environment data from the portable terminal apparatus;
extracting communication control data, corresponding to the received environment data, from the database;
adding the extracted communication control data to the received display screen definition data; and
transmitting the display screen definition data, into which the extracted communication control data is added, to the portable terminal apparatus,
wherein the transmitted communication control data represents a setting of an exception handling procedure for the data communication between the portable terminal apparatus and the central apparatus,
wherein the communication control data stored in the database represents the exception handling procedure, and
wherein the portable terminal apparatus performs the setting of the exception handling procedure.

4. A relay apparatus according to claim 3, wherein the communication control data includes information to specify an image displayed on said portable terminal apparatus from start to end of the communication between said portable terminal apparatus and said central apparatus.

5. A memory product storing a computer program executable by a computer that relays data communication between a portable terminal apparatus having a display for displaying an image and a central apparatus, said computer having a database storing communication control data in association with environment data identifying a position information of the portable terminal apparatus; the computer program comprising steps of:
causing the computer to receive display screen definition data from the central apparatus which defines the image displayed on the display of said portable terminal apparatus;
causing the computer to receive environment data from the portable terminal apparatus;
causing the computer to extract communication control data, corresponding to the received environment data, from the database;

causing the computer to add the extracted communication control data to the received display screen definition data; and causing the computer to transmit the display screen definition data, into which the extracted communication control data is added, to the portable terminal apparatus, wherein the transmitted communication control data represents a setting of an exception handling procedure for the data communication between the portable terminal apparatus and the central apparatus, wherein the communication control data stored in the database represents the exception handling procedure, and wherein the portable terminal apparatus performs the setting of the exception handling procedure.

6. A memory product according to claim 5, further having, as the communication control data, information to specify an image displayed on said portable terminal apparatus from start to end of the communication between said portable terminal apparatus and said central apparatus.

* * * * *